Patented Jan. 18, 1944

2,339,373

UNITED STATES PATENT OFFICE 2,339,373

ESTERS OF 9,9-DI-β-CARBOXYETHYL-FLUORENE

Herman A. Bruson, Philadelphia, Pa., assignor to The Resinous Products & Chemical Company, Philadelphia, Pa., a corporation of Delaware No Drawing. Application April 4, 1942, Serial No. 437,677

6 Claims. (Cl. 260—475)

This invention relates to new compounds which are derived from fluorene and which have particularly valuable properties as plasticizers or softeners for synthetic rubber derived from butadiene, for polyvinyl chloride and related plastics, and for other resinous compositions.

The object of this invention is to provide a class of compounds which toughen plastics in which they are incorporated without greatly softening them or decreasing their tensile strength.

The compounds which are provided by this invention are esters of monohydric alcohols and 9,9-di-(β-carboxyethyl)-fluorene having the formula—

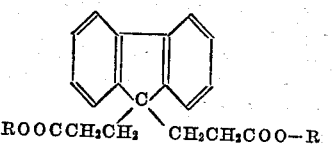

ROOCCH$_2$CH$_2$   CH$_2$CH$_2$COO—R wherein R represents the organic or non-hydroxylated radical of a monohydric primary or secondary alcohol of the aliphatic, aryl-aliphatic, or cycloaliphatic series, which is free from nitrogen.

These esters can be prepared by heating a monohydric alcohol, R—OH, with 9,9-di-(β-carboxyethyl)-fluorene, advantageously in the presence of acidic catalysts which promote the esterification, such as sulfuric acid, benzene sulfonic acid, phosphoric acid, zinc chloride, and the like, according to conventional methods, and allowing the water to distill off as rapidly as formed.

The 9,9-di-(β-carboxyethyl)-fluorene used is a new organic acid melting at 273–274° C., obtainable by reacting fluorene with acrylonitrile in the presence of an alkaline catalyst, such as potassium hydroxide or trimethyl benzyl ammonium hydroxide, and hydrolyzing the 9,9-di-(β-cyanoethyl)-fluorene which is formed. The procedure is described in detail in my copending application Serial No. 398,064 filed June 14, 1941, of which the present application is a continuation-in-part.

For the purpose of this invention, R is the organic radical of any aliphatic, arylaliphatic or cycloaliphatic non-tertiary alcohol, the hydroxyl group of which is the only functional group capable of reacting with a carboxyl group. R may be saturated or unsaturated but should be free from nitrogen. Typical monohydric alcohols are the following: methyl, ethyl, propyl, isopropyl, butyl, hexyl, octyl, undecyl, dodecyl, octadecyl, chloroethyl, allyl, methallyl, undecenyl, oleyl, ethoxyethyl, chloroethoxyethyl, propoxyethyl, butoxyethyl, caproxyethyl, ethoxypropyl, ethoxybutyl, ethoxyethoxyethyl, phenoxyethyl, phenoxyethoxyethyl, benzyl, chlorobenzyl, methyl benzyl, cyclohexyl, methyl cyclohexyl, cyclohexyl cyclohexyl, bornyl, camphyl, tetrahydro abietyl, etc.

On account of the high melting point of 9,9-di-(β-carboxyethyl)-fluorene and its unique structure the esters thereof tend to be solids and are often wax-like in character. When these esters are incorporated in plastics, they behave very much as camphor does in Celluloid, in that they give a high plasticizing action without undue softening. Furthermore, because of their high boiling points, they are practically non-volatile at temperatures to which plastics are ordinarily subjected.

The following examples illustrate this invention. The parts given are by weight.

*Example 1.*—A mixture of 186 parts of 9,9-di-(β-carboxyethyl)-fluorene, 50 parts of methanol, 250 parts of toluene, and 2 parts of concentrated sulfuric acid is boiled under a reflux condenser attached to a water trap for 15 hours during which time 9 c. c. of water are separated. Fresh methanol (50 parts) is then added to the charge and boiling is continued for 8 hours longer. The product is cooled, washed thoroughly with water, then with sodium carbonate solution, and finally with water. The toluene is evaporated off under reduced pressure and the solid residue is recrystallized from methanol. The dimethyl ester thus obtained forms colorless crystals melting at 81–82° C. The yield is about 102 parts of pure ester.

*Example 2.*—(a) A mixture of 186 parts of 9,9-di(β-carboxyethyl)-fluorene, 100 parts of ethanol, 150 parts of toluene, and 2 parts of concentrated sulfuric acid is boiled under a reflux condenser attached to a water trap until droplets of water no longer come over. This requires about 11 hours. The product is washed with water, with soda solution, and finally with water, and evaporated to dryness under reduced pressure. The solid residue consisting of 200 parts of diethyl ester thus obtained, forms colorless crystals melting at 102–103° C.

(b) In the same manner, the di-(chloroethyl) ester is obtained by using 200 parts of ethylene chlorohydrin in place of the ethanol.

*Example 3.*—By using 186 parts of 9,9-di-(β-carboxyethyl)-fluorene, 120 parts of isopropanol, 120 parts toluene, and 2 g. concentrated sulufuric acid and operating as described in Example 2, there is obtained the di-isopropyl ester of 9,9-di-(β-carboxyethyl)-fluorene. When recrystallized from methanol, it forms colorless crystals melting at 93–94° C.

*Example 4.*—A mixture consisting of 217 parts of 9,9-di-(β-carboxyethyl)-fluorene, 174 parts of allyl alcohol, 174 parts of toluene, and 3 parts of concentrated sulfuric acid is boiled for 6 hours under a reflux condenser attached to a water trap. The product is worked up as in Example 2. The di-allyl ester of 9,9-di-(β-carboxyethyl)-fluorene thus obtained in a yield of 208 parts, forms waxy crystals melting at 55° C. after recrystallization from methanol.

It is useful not only as plasticizer but can itself be polymerized at 90–95° C. in the presence of 2% by weight of benzoyl peroxide to a colorless plastic resin.

*Example 5.*—(a) A mixture consisting of 186 parts of 9,9-di-(β-carboxyethyl)-fluorene, 300 parts of n-butanol, 300 parts of toluene, and 2 parts of concentrated sulfuric acid is boiled under a reflux condenser attached to a water trap for about four hours until 21 parts of water have distilled over in the trap. The product is then worked up as in Example 2 to yield the di-n-butyl ester of 9,9-di-(β-carboxyethyl)-fluorene in a yield of 250 parts as a crystalline solid boiling at 245–250° C./1 m. m. and having a melting point of 54° C. after recrystallization from methanol.

(b) In the same manner by using 300 parts of isobutanol or butanol-2 in place of the n-butanol above, the corresponding di-isobutyl or di-sec-butyl esters of 9,9-di-(β-carboxyethyl)-fluorene are obtained.

*Example 6.*—A mixture of 135 parts of 9,9-di-(β-carboxyethyl)-fluorene, 200 parts of cyclohexanol, 200 parts of toluene, and 3 parts of concentrated sulfuric acid is boiled in a flask under a reflux condenser for 3 hours. The water formed in the resulting reaction is distilled off and is collected in a trap which allows the toluene and cyclohexanol to return to the flask. The reaction mixture is cooled and is then washed with water, with soda solution and finally with water, then dried, and evaporated to dryness under reduced pressure.

The di-cyclohexyl ester is obtained as an amber-colored transparent mass (172 parts) which crystallizes from methanol in colorless crystals melting at 115–6° C.

*Example 7.*—A mixture of 186 parts of 9,9-di-(β-carboxyethyl)-fluorene, 200 parts of benzyl alcohol, 150 parts of toluene, and 5 parts of concentrated hydrochloric acid is boiled for 8½ hours under reflux until water ceases to come over in a water trap attached to the reflux condenser. The product is cooled, washed with water, with soda solution and finally with water, then dried and evaporated under reduced pressure to remove the solvent.

The di-benzyl ester of 9,9-di-(β-carboxyethyl)-fluorene is obtained as a solid mass.

*Example 8.*—(a) By boiling 186 parts of 9,9-di-(β-carboxyethyl)-fluorene, 150 parts of β-ethoxyethanol, 150 parts of toluene, and 2 parts of concentrated sulfuric acid for 6½ hours, washing, drying, and concentrating the product as described in Example 6, there are obtained 196 parts of pale yellow oil consisting of the di-(β-ethoxy-ethyl) ester of 9,9-di-(β-carboxyethyl)-fluorene.

(b) By the use of 200 parts of β-butoxy-ethanol in place of the β-ethoxy ethanol, di-(β-butoxy-ethyl) ester of 9,9-di-(β-carboxyethyl)-fluorene is obtained as a thick oil. These materials are valuable for softening the butadiene-acrylonitrile copolymer type of synthetic rubber.

When R represents a lower aliphatic group from a non-tertiary alcohol, the resulting di-esters are particularly useful in connection with the vinyl resins. The di-esters from the lower alcohols having one to seven carbon atoms in general have the advantage that they can be purified by distillation under reduced pressure. When R represents a hydrocarbon group, such as iso-amyl, sec-amyl, α-ethyl butyl, α-ethyl hexyl, sec-octyl, dodecyl, or octadecyl, the products are waxy solids having excellent plasticizing action for synthetic rubbers, waxes, as well as other plastics. The di-esters prepared from ether alcohols are particularly useful in conjunction with ester and ether types of plastics, while the esters from saturated and unsaturated alcohols having carbocycles, such as the cyclohexyl or benzyl esters, are particularly effective in conjunction with styrene and related resins.

I claim:

1. As a new compound, a di-ester of 9,9-di-(β-carboxyethyl)-fluorene and a monohydric non-tertiary alcohol.

2. As a new compound, an ester of 9,9-di-(β-carboxyethyl)-fluorene and a non-tertiary ether alcohol.

3. As a new compound, an ester of 9,9-di-(β-carboxyethyl)-fluorene and a lower aliphatic monohydric non-tertiary alcohol.

4. As a new compound, an ester of 9,9-di-(β-carboxyethyl)-fluorene and n-butanol.

5. As a new compound, an ester of 9,9-di-(β-carboxyethyl)-fluorene and β-ethoxyethanol.

6. As a new compound, an ester of 9,9-di-(β-carboxyethyl)-fluorene and allyl alcohol.

HERMAN A. BRUSON.